US011395332B2

(12) United States Patent
Choe et al.

(10) Patent No.: US 11,395,332 B2
(45) Date of Patent: Jul. 19, 2022

(54) SKIPPING CONTENTION RESOLUTION IN DATA TRANSMISSION

(71) Applicant: LG ELECTRONICS INC., Seoul (KR)

(72) Inventors: Hyunjung Choe, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/268,069

(22) PCT Filed: Sep. 27, 2019

(86) PCT No.: PCT/KR2019/012572
§ 371 (c)(1),
(2) Date: Feb. 11, 2021

(87) PCT Pub. No.: WO2020/067757
PCT Pub. Date: Apr. 2, 2020

(65) Prior Publication Data
US 2021/0315005 A1    Oct. 7, 2021

(30) Foreign Application Priority Data
Sep. 28, 2018   (KR) ........................ 10-2018-0115541

(51) Int. Cl.
*H04W 74/04*       (2009.01)
(52) U.S. Cl.
CPC .................................. *H04W 74/04* (2013.01)

(58) Field of Classification Search
CPC ...... H04W 74/00; H04W 74/04; H04W 74/08
See application file for complete search history.

(56) References Cited

U.S. PATENT DOCUMENTS

| 2014/0328329 | A1* | 11/2014 | Novlan ............... H04W 56/002 |
| | | | 370/336 |
| 2018/0279375 | A1 | 9/2018 | Jeon et al. |
| 2018/0324854 | A1* | 11/2018 | Phuyal ............... H04W 74/085 |
| 2019/0364605 | A1* | 11/2019 | Loehr ................. H04W 74/006 |
| 2020/0022214 | A1* | 1/2020 | Takahashi ......... H04W 74/0833 |
| 2020/0107370 | A1* | 4/2020 | Wei ....................... H04W 72/14 |
| 2020/0120709 | A1* | 4/2020 | Bergquist ............. H04W 72/14 |

(Continued)

FOREIGN PATENT DOCUMENTS

WO       2017212443       12/2017

OTHER PUBLICATIONS

PCT International Application No. PCT/KR2019/012572, International Search Report dated Jan. 9, 2020, 2 pages.

(Continued)

*Primary Examiner* — Kashif Siddiqui
(74) *Attorney, Agent, or Firm* — Lee Hong Degerman Kang Waimey

(57) ABSTRACT

Provided are a method for skipping contention resolution. According to an embodiment of the present disclosure, the method includes: detecting data to be transmitted; receiving information informing that the data does not require a contention resolution; transmitting the data on a logical channel; and completing transmission of the data, based on an acknowledgement for the data or a number of transmission of the data.

10 Claims, 11 Drawing Sheets

(56) References Cited

U.S. PATENT DOCUMENTS

2020/0154487 A1* 5/2020 Shrivastava .......... H04W 76/27
2020/0351953 A1* 11/2020 Pradas ................ H04W 74/006

OTHER PUBLICATIONS

ZTE, et al., "On early data transmission for eMTC," 3GPP TSG RAN WG1 Meeting #92, R1-1801619, Mar. 2018, 7 pages.
Sierra Wireless, "Pre-configured UL Resources Design Considerations," 3GPP TSG RAN WG1 Meeting 94, R1-1808357, Aug. 2018, 7 pages.
Mediatek Inc., "Further considerations on 2-step RACH," 3GPP TSG-RAN WG2 Meeting #103bis, R2-1813965, Oct. 2018, 9 pages.

* cited by examiner

SKIPPING CONTENTION RESOLUTION IN DATA TRANSMISSION

CROSS-REFERENCE TO RELATED APPLICATIONS

This application is the National Stage filing under 35 U.S.C. 371 of International Application No. PCT/KR2019/012572 filed on Sep. 27, 2019, which claims the benefit of earlier filing date and right of priority to KR Application Nos. 10-2018-0115541 filed on Sep. 28, 2018, the contents of which is hereby incorporated by reference herein in its entirety.

TECHNICAL FIELD

The present disclosure relates to data transmission.

BACKGROUND

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

With the introduction of the new RRC state (i.e., RRC-INACTIVE state) in NR, the UE may incur minimum signaling, minimize power consumption, minimize resource costs in the network. In order to support this concept in NR, the UE may also be able to transmit the data without state transition from the RRC-INACTIVE to the RRC-CONNECTED. Early data transmission (EDT) refers to the operation of transmitting data before the RRC connection setup is completed, if the size of the data to be transmitted is small. In other words, according to the EDT, data transmission is allowed even when the UE is not in the RRC connection state.

SUMMARY

In a prior art, a wireless device may be configured to perform contention resolution procedure for EDT. However, even in case of EDT, the contention resolution may be considered as unnecessary depending on requirements of service.

According to an embodiment of the present disclosure, a method performed by a wireless device in a wireless communication system is provided. The method may comprise detecting data to be transmitted, receiving information informing that the data does not require a contention resolution, transmitting the data on a logical channel and completing transmission of the data, based on an acknowledgement for the data or a number of transmission of the data.

The present disclosure can have various advantageous effects.

For example, the UE may perform EDT transmission by skipping contention resolution.

For example, with shared resource allocation, it may utilize radio resources efficiently.

For example, the UE may determine whether data transmission is successful or not without monitoring feedback on DL reception.

For example, reduction of power consumption may be expected by minimize steps of procedure of data transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
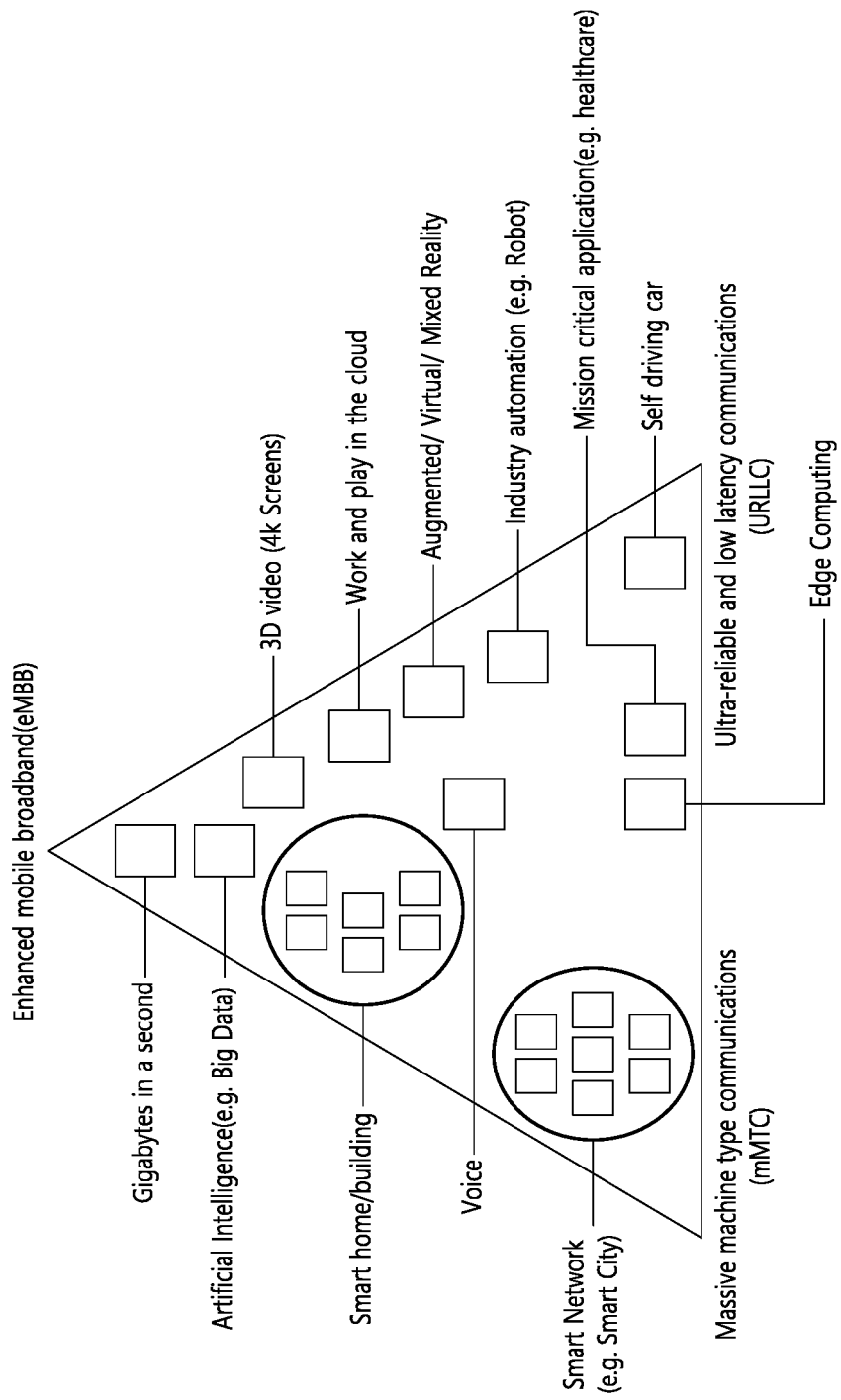
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C". Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
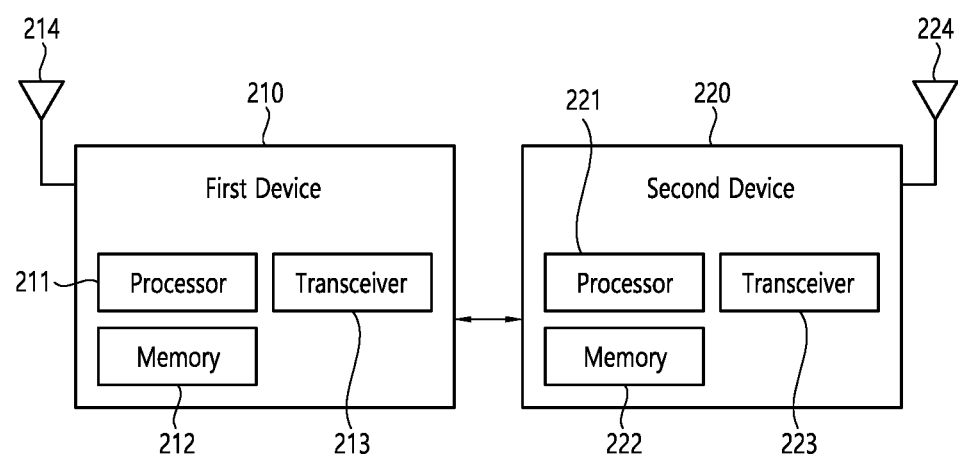
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
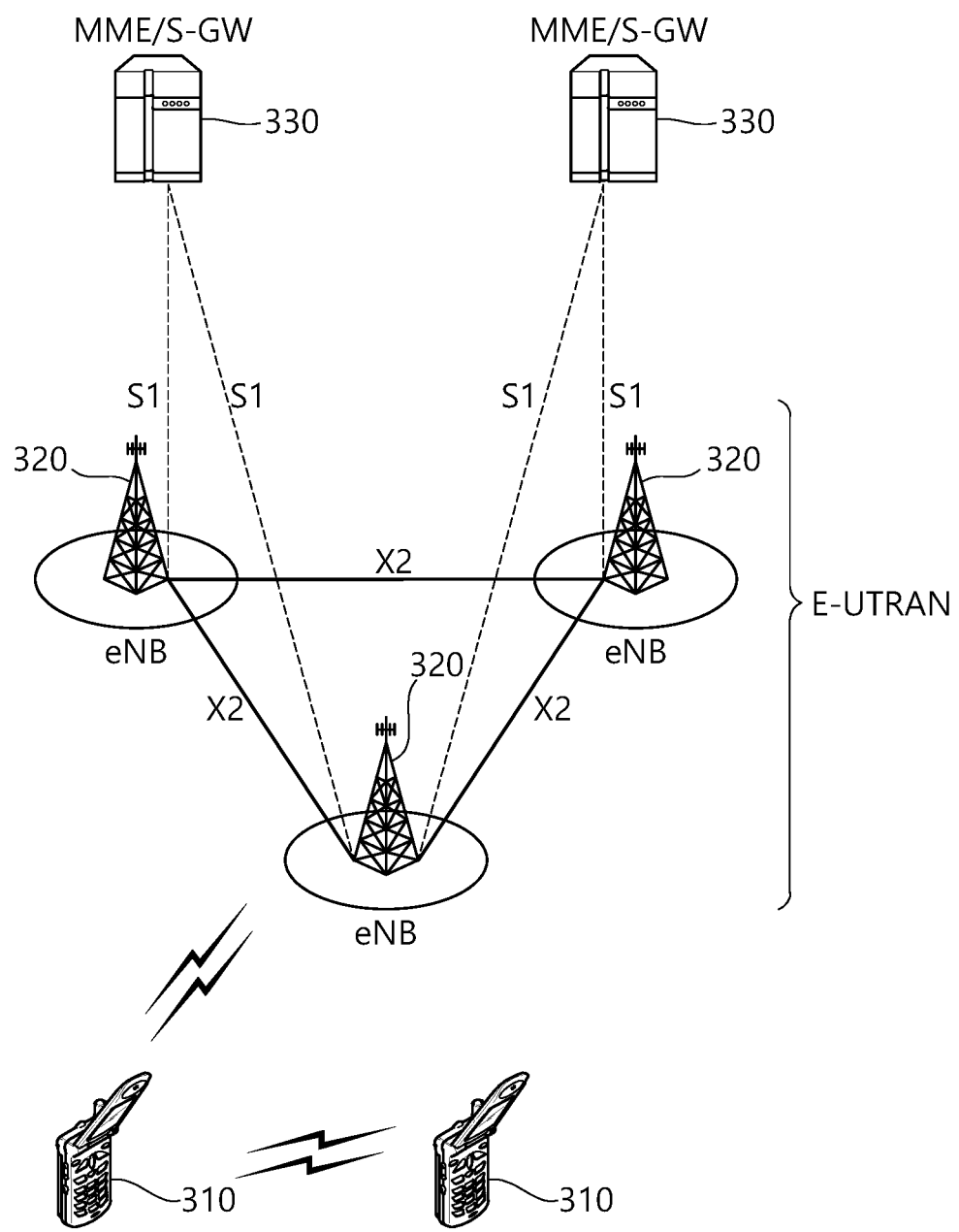
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
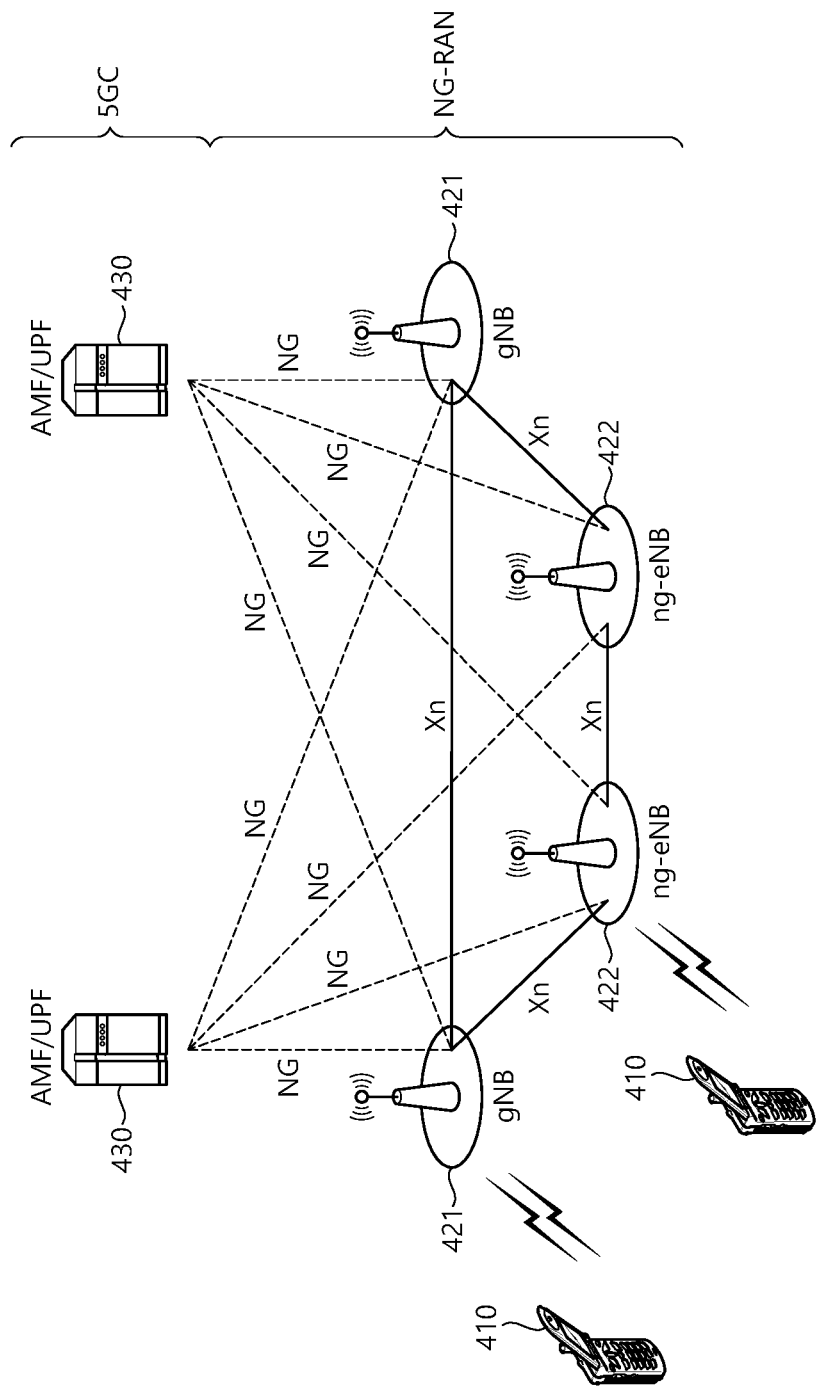
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 5:
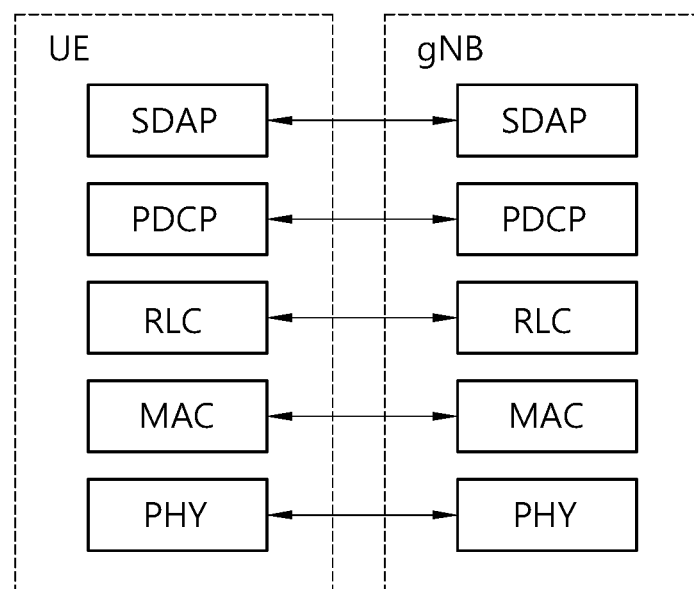
FIG. 5 shows a block diagram of a user plane protocol stack to which the technical features of the present disclosure can be applied.
Figure 6:
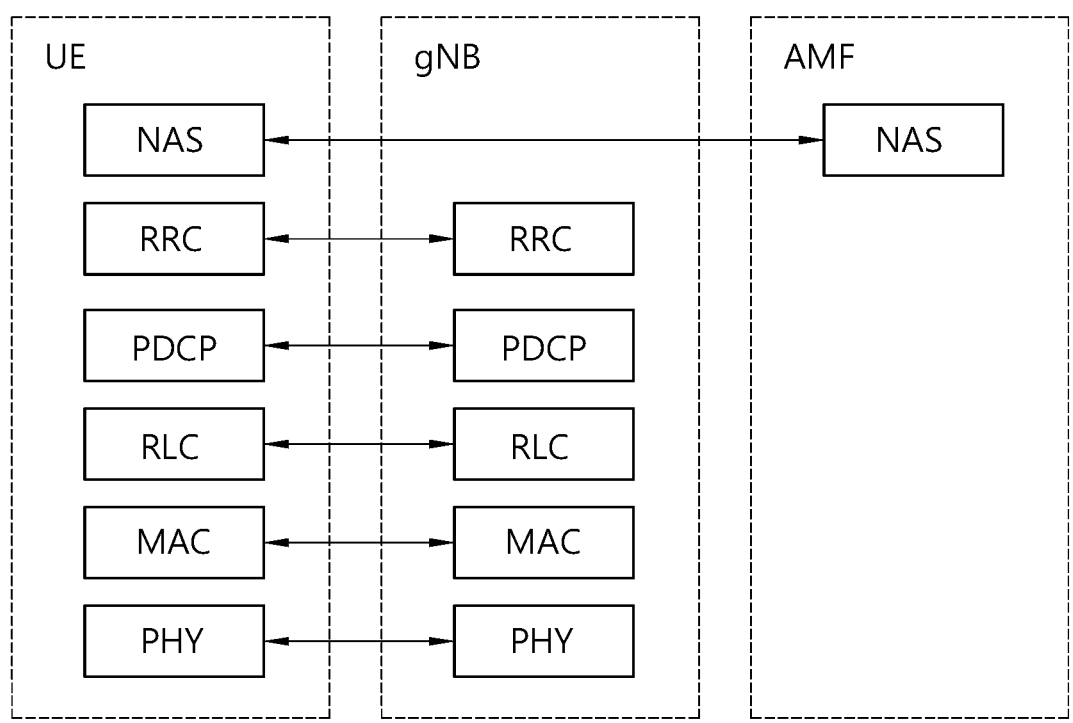
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, random access will be described.

Random access is used by a UE to obtain uplink synchronization with a BS or to be allocated an uplink radio resource. After power is turned on, a UE obtains downlink synchronization with an initial cell and receives system information. Then, the UE acquires, from the system information, a set of available random access preambles and information about a radio resource used for transmission of a random access preamble. The radio resource used for transmission of the random access preamble may be specified as a radio frame and/or a combination of at least one or more subframes. The UE transmits a random access preamble randomly selected from the set of random access preambles, and the BS having received the random access preamble sends a timing alignment (TA) value for uplink synchronization to the UE through a random access response. Thus, the UE obtains uplink synchronization.

That is, the BS allocates a dedicated random access preamble to a specific UE, and the UE performs non-contention random access using the random access preamble. That is, there may be in a process of selecting a random access preamble, contention-based random access in which a UE randomly selects and uses one random access preamble from a particular set and non-contention random access in which only a specific UE is allocated a random access preamble by a BS. Non-contention random access may be used for a handover procedure or upon a request by a BS's command.

The Random Access Resource selection procedure shall be performed as follows:

For BL UEs or UEs in enhanced coverage or NB-IoT UEs, if EDT is initiated by the upper layers:
if the message size (UL data available for transmission plus MAC header and, where required, MAC control elements) is larger than the TB size signalled in edt-TBS for the selected enhanced coverage level for EDT; or
if the PRACH resource associated with EDT for the selected enhanced coverage level is not available:
indicate to upper layers that EDT is cancelled;
For BL UEs or UEs in enhanced coverage, select the PRACH resource set corresponding to the selected enhanced coverage level. For EDT, the PRACH resource set shall correspond to the set associated with EDT for the selected enhanced coverage level.
If, except for NB-IoT, ra-PreambleIndex (Random Access Preamble) and ra-PRACH-MaskIndex (PRACH Mask Index) have been explicitly signalled and ra-PreambleIndex is not 000000:
the Random Access Preamble and the PRACH Mask Index are those explicitly signalled;
else, for NB-IoT, if ra-PreambleIndex (Random Access Preamble) and PRACH resource have been explicitly signalled:
the PRACH resource is that explicitly signalled;
if the ra-PreambleIndex signalled is not 000000:
if ra-CFRA-Config is configured:
the Random Access Preamble is set to nprach-SubcarrierOffset+nprach-NumCBRA-StartSubcarriers+(ra-PreambleIndex modulo (nprach-NumSubcarriers–nprach-NumCBRA-StartSubcarriers)), where nprach-SubcarrierOffset, nprach-NumCBRA-StartSubcarriers and nprach-NumSubcarriers are parameters in the currently used PRACH resource.
else:
the Random Access Preamble is set to nprach-SubcarrierOffset+(ra-PreambleIndex modulo nprach-NumSubcarriers), where nprach-SubcarrierOffset and nprach-NumSubcarriers are parameters in the currently used PRACH resource.
else:
select the Random Access Preamble group according to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
randomly select a Random Access Preamble within the selected group.
else the Random Access Preamble shall be selected by the MAC entity as follows:
For BL UEs or UEs in enhanced coverage, if EDT is started, select the Random Access Preambles group corresponding to PRACH resource for EDT for the selected enhanced coverage level. Otherwise, if Random Access Preamble group B does not exist, select the Random Access Preambles group corresponding to the selected enhanced coverage level.
For NB-IoT, randomly select one of the PRACH resources corresponding to the selected enhanced coverage level according to the configured probability distribution, and select the Random Access Preambles group corresponding to the PRACH resource and the support for multi-tone Msg3 transmission. A UE supporting multi-tone Msg3 shall only select the single-tone Msg3 Random Access Preambles group if there is no multi-tone Msg3 Random Access Preambles group. For EDT, the PRACH resource shall correspond to resource associated with EDT for the selected enhanced coverage level.
Except for BL UEs or UEs in enhanced coverage in case preamble group B does not exist, or except for NB-IoT UEs, if Msg3 has not yet been transmitted, the MAC entity shall:
if Random Access Preambles group B exists and any of the following events occur:
the potential message size (UL data available for transmission plus MAC header and, where required, MAC control elements) is greater than messageSizeGroupA and the pathloss is less than PCMAX,c (of the Serving Cell performing the Random Access Procedure)–preambleInitialReceivedTargetPower–deltaPreambleMsg3–messagePowerOffsetGroupB;
the Random Access procedure was initiated for the CCCH logical channel and the CCCH SDU size plus MAC header is greater than messageSizeGroupA;
select the Random Access Preambles group B;
else:
select the Random Access Preambles group A.
else, if Msg3 is being retransmitted, the MAC entity shall:
select the same group of Random Access Preambles as was used for the preamble transmission attempt corresponding to the first transmission of Msg3.
randomly select a Random Access Preamble within the selected group. The random function shall be such that each of the allowed selections can be chosen with equal probability;
except for NB-IoT, set PRACH Mask Index to 0.
determine the next available subframe containing PRACH permitted by the restrictions given by the prach-ConfigIndex (except for NB-IoT), the PRACH Mask Index (except for NB-IoT), physical layer timing requirements and in case of NB-IoT, the subframes occupied by PRACH resources related to a higher enhanced coverage level (a MAC entity may take into account the possible occurrence of measurement gaps when determining the next available PRACH subframe);
except for NB-IoT, if the transmission mode is TDD and the PRACH Mask Index is equal to zero:
if ra-PreambleIndex was explicitly signalled and it was not 000000 (i.e., not selected by MAC):
randomly select, with equal probability, one PRACH from the PRACHs available in the determined subframe.
else:
randomly select, with equal probability, one PRACH from the PRACHs available in the determined subframe and the next two consecutive subframes.
else:
determine a PRACH within the determined subframe in accordance with the requirements of the PRACH Mask Index, if any.
for NB-IoT UEs, BL UEs or UEs in enhanced coverage, select the ra-ResponseWindowSize and mac-ContentionResolutionTimer corresponding to the selected enhanced coverage level and PRACH.

proceed to the transmission of the Random Access Preamble.

When an uplink transmission is required, e.g., for contention resolution, the eNB should not provide a grant smaller than 56 bits (or 88 bits for NB-IoT) in the Random Access Response.

Contention Resolution is based on either C-RNTI on PDCCH of the SpCell or UE Contention Resolution Identity on DL-SCH.

Once Msg3 is transmitted, the MAC entity shall:
except for a BL UE or a UE in enhanced coverage, or an NB-IoT UE, start mac-ContentionResolutionTimer and restart mac-ContentionResolutionTimer at each HARQ retransmission;
for a BL UE or a UE in enhanced coverage, or an NB-IoT UE, start mac-ContentionResolutionTimer and restart mac-ContentionResolutionTimer at each HARQ retransmission of the bundle in the subframe containing the last repetition of the corresponding PUSCH transmission;
regardless of the possible occurrence of a measurement gap or Sidelink Discovery Gap for Reception, monitor the PDCCH until mac-ContentionResolutionTimer expires or is stopped;
if notification of a reception of a PDCCH transmission is received from lower layers, the MAC entity shall:
if the C-RNTI MAC control element was included in Msg3:
if the Random Access procedure was initiated by the MAC sublayer itself or by the RRC sublayer and the PDCCH transmission is addressed to the C-RNTI and contains an UL grant for a new transmission; or
if the Random Access procedure was initiated by a PDCCH order and the PDCCH transmission is addressed to the C-RNTI:
consider this Contention Resolution successful;
stop mac-ContentionResolutionTimer;
discard the Temporary C-RNTI;
if the UE is an NB-IoT UE:
the UL grant or DL assignment contained in the PDCCH transmission is valid only for the configured carrier.
consider this Random Access procedure successfully completed.
else if the CCCH SDU was included in Msg3 and the PDCCH transmission is addressed to its Temporary C-RNTI:
if the MAC PDU is successfully decoded:
stop mac-ContentionResolutionTimer;
if the MAC PDU contains a UE Contention Resolution Identity MAC control element; and
if the UE Contention Resolution Identity included in the MAC control element matches the 48 first bits of the CCCH SDU transmitted in Msg3:
consider this Contention Resolution successful and finish the disassembly and demultiplexing of the MAC PDU;
set the C-RNTI to the value of the Temporary C-RNTI;
discard the Temporary C-RNTI;
consider this Random Access procedure successfully completed.
else
discard the Temporary C-RNTI;
consider this Contention Resolution not successful and discard the successfully decoded MAC PDU.
if mac-ContentionResolutionTimer expires:
for BL UEs or UEs in CE or NB-IoT UEs:
if notification of a reception of a PDCCH transmission has been received from lower layers before mac-ContentionResolutionTimer expired; and
if the MAC PDU received until the subframe that contains the last repetition of the corresponding PDSCH transmission is successfully decoded; and
if the MAC PDU contains a UE Contention Resolution Identity MAC control element; and
if the UE Contention Resolution Identity included in the MAC control element matches the 48 first bits of the CCCH SDU transmitted in Msg3:
consider this Contention Resolution successful and finish the disassembly and demultiplexing of the MAC PDU;
set the C-RNTI to the value of the Temporary C-RNTI;
discard the Temporary C-RNTI;
consider this Random Access procedure successfully completed.
else:
discard the Temporary C-RNTI;
consider this Contention Resolution not successful.
except for BL UEs or UEs in CE or NB-IoT UEs:
discard the Temporary C-RNTI;
consider the Contention Resolution not successful.
if the Contention Resolution is considered not successful the MAC entity shall:
flush the HARQ buffer used for transmission of the MAC PDU in the Msg3 buffer;
if the notification of power ramping suspension has not been received from lower layers:
increment PREAMBLE_TRANSMISSION_COUNTER by 1;
if the UE is an NB-IoT UE, a BL UE or a UE in enhanced coverage:
if PREAMBLE_TRANSMISSION_COUNTER= preambleTransMax-CE+1:
indicate a Random Access problem to upper layers.
if NB-IoT:
consider the Random Access procedure unsuccessfully completed;
else:
if PREAMBLE_TRANSMISSION_COUNTER= preambleTransMax+1:
indicate a Random Access problem to upper layers.
based on the backoff parameter, select a random backoff time according to a uniform distribution between 0 and the Backoff Parameter Value;
delay the subsequent Random Access transmission by the backoff time;
proceed to the selection of a Random Access Resource.

There is one HARQ entity at the MAC entity for each Serving Cell which maintains a number of parallel HARQ processes. Each HARQ process is associated with a HARQ process identifier. The HARQ entity directs HARQ information and associated TBs received on the DL-SCH to the corresponding HARQ processes.

When the physical layer is configured for downlink spatial multiplexing, one or two TBs are expected per TTI and they are associated with the same HARQ process. Otherwise, one TB is expected per TTI.

For NB-IoT UEs or BL UEs or UEs in enhanced coverage, the parameter DL_REPETITION_NUMBER provides the number of transmissions repeated in a bundle. For each bundle, DL_REPETITION_NUMBER is set to a value provided by lower layers. Within a bundle, after the initial (re)transmission, DL_REPETITION_NUMBER-1 HARQ retransmissions follow. The HARQ feedback is transmitted for the bundle and a downlink assignment corresponding to a new transmission or a retransmission of the bundle is received after the last repetition of the bundle. A retransmission of a bundle is also a bundle.

If the MAC entity is configured with blindSlotSubslotPDSCH-Repetitions or blindSubframePDSCH-Repetitions on a serving cell, the parameter DL_REPETITION_NUMBER provides the number of transmissions repeated in a bundle for a downlink assignment received on that serving cell. For each bundle, DL_REPETITION_NUMBER and the redundancy version for each transmission within a bundle are set to values provided by lower layers. Within a bundle, after the initial (re-)transmission, DL_REPETITION_NUMBER-1 HARQ retransmissions follow. The HARQ feedback is sent only one time for the bundle and after the last transmission of the bundle.

In addition to the broadcast HARQ process, NB-IoT has one or two DL HARQ processes.

The MAC entity shall:
If a downlink assignment has been indicated for this TTI; or
If this TTI is for a retransmission within a bundle:
allocate the TB(s) received from the physical layer and the associated HARQ information to the HARQ process indicated by the associated HARQ information.
If a downlink assignment has been indicated for the broadcast HARQ process:
allocate the received TB to the broadcast HARQ process.
In case of BCCH and BR-BCCH a dedicated broadcast HARQ process is used.

HARQ process is described.

For each TTI where a transmission takes place for the HARQ process, one or two (in case of downlink spatial multiplexing) TBs and the associated HARQ information are received from the HARQ entity.

For each received TB and associated HARQ information, the HARQ process shall:
if the NDI, when provided, has been toggled compared to the value of the previous received transmission corresponding to this TB; or
if the HARQ process is equal to the broadcast process and if this is the first received transmission for the TB according to the system information schedule indicated by RRC; or
if this is the very first received transmission for this TB (i.e. there is no previous NDI for this TB):
consider this transmission to be a new transmission.
else:
consider this transmission to be a retransmission.
The MAC entity then shall:
if this is a new transmission:
attempt to decode the received data.
else if this is a retransmission:
if the data for this TB has not yet been successfully decoded:
combine the received data with the data currently in the soft buffer for this TB and attempt to decode the combined data.
if the data which the MAC entity attempted to decode was successfully decoded for this TB; or
if the data for this TB was successfully decoded before:
if the HARQ process is equal to the broadcast process:
deliver the decoded MAC PDU to upper layers.
else if this is the first successful decoding of the data for this TB:
deliver the decoded MAC PDU to the disassembly and demultiplexing entity.
generate a positive acknowledgement (ACK) of the data in this TB.
else:
replace the data in the soft buffer for this TB with the data which the MAC entity attempted to decode.
generate a negative acknowledgement (NACK) of the data in this TB.
if the HARQ process is associated with a transmission indicated with a Temporary C-RNTI and the Contention Resolution is not yet successful; or
if the HARQ process is equal to the broadcast process; or
if the timeAlignmentTimer, associated with the TAG containing the serving cell on which the HARQ feedback is to be transmitted, is stopped or expired:
do not indicate the generated positive or negative acknowledgement to the physical layer.
else:
indicate the generated positive or negative acknowledgement for this TB to the physical layer.

The MAC entity shall ignore NDI received in all downlink assignments on PDCCH for its Temporary C-RNTI when determining if NDI on PDCCH for its C-RNTI has been toggled compared to the value in the previous transmission.

If the MAC entity receives a retransmission with a TB size different from the last valid TB size signalled for this TB, the UE behavior is left up to UE implementation.

Early data transmission (EDT) is described.

With the introduction of the new RRC state (i.e., RRC-INACTIVE state) in NR, the UE may incur minimum signaling, minimize power consumption, minimize resource costs in the network. In order to support this concept in NR, the UE may also be able to transmit the data without state transition from the RRC-INACTIVE to the RRC-CONNECTED. Early data transmission (EDT) refers to the operation of transmitting data before the RRC connection setup is completed, if the size of the data to be transmitted is small. In other words, according to the EDT, data transmission is allowed even when the UE is not in the RRC connection state.

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

EDT for Control Plane CIoT EPS optimizations, as defined in TS 24.301 [20], is characterized as below:
Uplink user data are transmitted in a NAS message concatenated in UL RRCEarlyDataRequest message on CCCH;
Downlink user data are optionally transmitted in a NAS message concatenated in DL RRCEarlyDataComplete message on CCCH;
There is no transition to RRC CONNECTED.

The EDT procedure for Control Plane CIoT EPS optimizations is described as below.

1. Upon connection establishment request for Mobile Originated data from the upper layers, the UE initiates the early data transmission procedure and selects a random access preamble configured for EDT.

2. UE sends RRCEarlyDataRequest message concatenating the user data on CCCH.

3. The eNB initiates the S1-AP Initial UE message procedure to forward the NAS message and establish the S1 connection. The eNB may indicate in this procedure that this connection is triggered for EDT.

4. The MME requests the S-GW to re-activate the EPS bearers for the UE.

5. The MME sends the uplink data to the S-GW.

6. If downlink data are available, the S-GW sends the downlink data to the MME.

7. If downlink data are received from the S-GW, the MME forwards the data to the eNB via DL NAS Transport procedure and may also indicate whether further data are expected. Otherwise, the MME may trigger Connection Establishment Indication procedure and also indicate whether further data are expected.

8. If no further data are expected, the eNB can send the RRCEarlyDataComplete message on CCCH to keep the UE in RRC_IDLE. If downlink data were received in step 7, they are concatenated in RRCEarlyDataComplete message.

9. The S1 connection is released and the EPS bearers are deactivated.

If the MME or the eNB decides to move the UE in RRC_CONNECTED mode, RRCConnectionSetup message is sent in step 8 to fall back to the legacy RRC Connection establishment procedure; the eNB will discard the zero-length NAS PDU received in msg5.

In a prior art, a wireless device may be configured to perform contention resolution procedure for EDT, because contention resolution may guarantee successful data transmission for a specific device. However, even in case of EDT, the contention resolution may be considered as unnecessary depending on requirements of service. In this case, shared resource allocation may be acceptable. If some amount of data loss is allowable depending on importance of the data for internet-of-thing (IoT) applications, the contention resolution may not be always required. For example, in mMTC, a data collector may not need to fully collect data from each device in the area where massive IoT devices are deployed in a particular coverage. Also, data retransmission in failure cases may not be required because data loss is not critical. Thus, it may be needed to transmit data without contention resolution, even in case of EDT.

Meanwhile, in shared resource allocation, it may enable data transmission for plurality of devices at the same time. That is, it may utilize the radio resources efficiently. On the other hand, without contention resolution, the device may not be sure if the data transmission is successful or not. Therefore, following embodiments may suggest a method how to determine whether the data transmission is successful. The following embodiments may not be restricted in the background described above.

In this description, a method for skipping contention resolution according to an embodiment of the present disclosure may be described. According to an embodiment, a UE may determine that data transmission via radio resources not configured with contention resolution is successful, based on acknowledgement or a number of data transmission.

Figure 7:
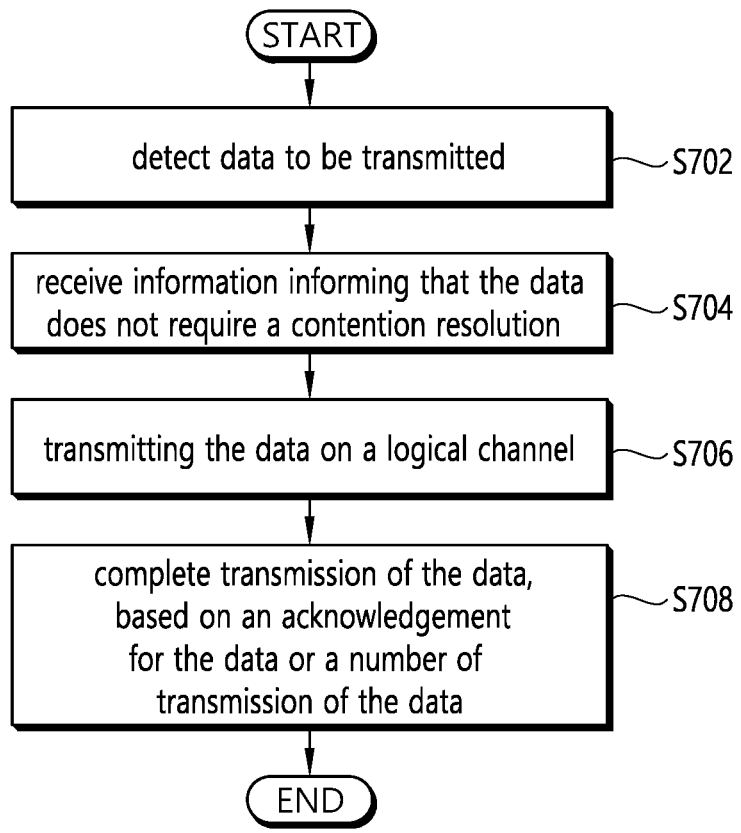
FIG. 7 shows a method for skipping contention resolution according to an embodiment of the present disclosure.

FIG. 7 shows a method for skipping contention resolution according to an embodiment of the present disclosure. In this embodiment, a wireless device may communicate with at least one of a mobile terminal, a network or autonomous vehicles other than the wireless device.

In step S702, the wireless device may detect data to be transmitted.

In step S704, the wireless device may receive information informing that the data does not require a contention resolution. The information may inform that the other logical channel on the specific radio resource requires the contention resolution. The information may be configured per the specific radio resource.

In step S704, the wireless device may transmit the data on a logical channel. The data may be transmitted via a medium access control (MAC) packet data unit (PDU) in a random access procedure. The logical channel may be mapped to a specific radio resource. The specific radio resource may be one of random access channel (RACH) resources, semi-persistent scheduling (SPS) resources, configured grants and dynamic grants. The specific radio resource may be configured to further deliver at least one other logical channel.

In step S708, the wireless device may complete transmission of the data, based on an acknowledgement for the data or a number of transmission of the data. The completing the transmission of the data may include determining whether the number of transmission of the data exceeds a threshold value. The threshold value may be preconfigured in the wireless device or configured by a network.

According to embodiments of the present disclosure, the UE may perform EDT transmission by skipping contention resolution. With shared resource allocation, it may utilize radio resources efficiently. Further, the UE may determine whether data transmission is successful or not without monitoring feedback on DL reception. Further, reduction of power consumption may be expected by minimize steps of procedure of data transmission.

In this description, a UE may be not only a terminal device, but also any types of device operating as wireless device, for example an integrated access backhaul (IAB) node.

According to an embodiment of the present disclosure, a UE may receive configuration indicating that contention resolution is configured for a first set of logical channel. The UE may receive configuration indicating that contention resolution is not configured for a second set of logical channel. The first set and the second set of logical channel may include at least one of logical channel, respectively. The data on first set of logical channel and the second set of logical channel may be transmitted via same particular radio resource. Also, the data on first set of logical channel and the second set of logical channel may be transmitted via different radio resources. The configuration may be configured per logical channel. The configuration may be configured per particular radio resources. The radio resources may be at least one of RACH resources, SPS resources, Configured grants and Dynamic grants. In this embodiment, at least a portion of data transmitted on the second set of logical channel may be missing, because the second set of logical channel is not configured with contention resolution.

In this embodiment, the configuration may indicate whether specific data is configured with contention resolution or not. The data configured with contention resolution may correspond to the first set of logical channel. The data not configured with contention resolution may correspond to the second set of logical channel. The configuration may be configured per type of at least one of data, logical channel and radio resource.

If the UE performs uplink transmission of a MAC PDU including data from a logical channel of the first set via the radio resource(s), the UE may consider the transmission as successful upon receiving both HARQ ACK and contention resolution information. If the UE performs uplink transmission of a MAC PDU not including data from any logical channel of the first set via the radio resource(s), the UE may consider the transmission as successful upon receiving HARQ ACK only or after a fixed number of transmissions.

According to an embodiment of the present disclosure, a UE may be configured with multiple configured grants. The UE may receive configuration in which contention resolution is configured for a first set of configured grants and not configured for the second set of configured grants in uplink transmission. The configured grant may correspond to a group of radio resources occurring every time interval.

If the UE performs uplink transmission of a MAC PDU via a configured grant of the first set, the UE may consider the transmission as successful upon receiving both HARQ ACK and contention resolution information. If the UE performs uplink transmission of a MAC PDU via a configured grant of the second set, the UE may consider the transmission as successful upon receiving HARQ ACK only or after a fixed number of transmissions.

Figure 8:
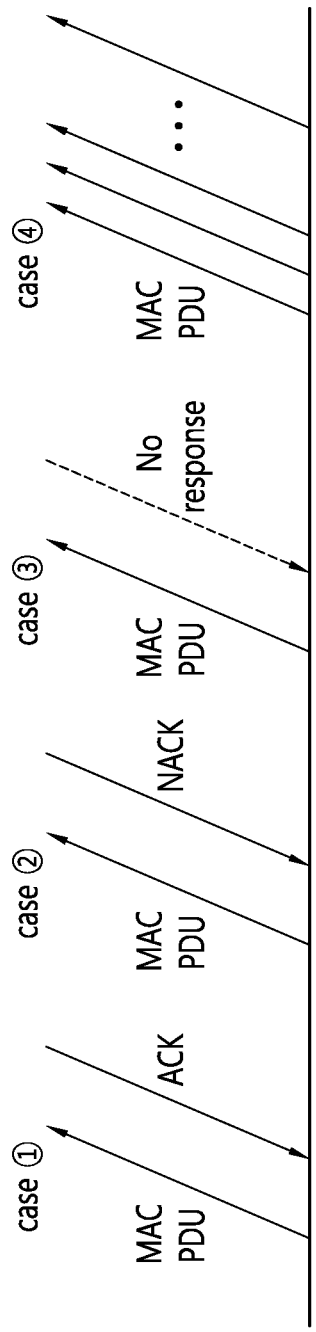
FIG. 8 shows an example of skipping contention resolution according to an embodiment of the present disclosure.

FIG. 8 shows an example of skipping contention resolution according to an embodiment of the present disclosure. In this embodiment, a configuration indicating that contention resolution may be preconfigured in the UE as subscription information. The configuration may be configured from the network via system information or dedicated signalings.

Referring to case ① of FIG. 8, the UE may consider that Msg3 data delivery is successful upon reception of HARQ ACK, although the UE does not receive Msg4 as the response. When the UE considers that Msg3 data is successfully delivered, the procedure may be completed. If the UE transmits Msg3 in RRC_IDLE, the UE may stay in RRC_IDLE. If the UE transmits Msg3 in RRC_CONNECTED, the UE may transit to RRC_IDLE if no further UL data exists. Similarly, if the UE transmits Msg3 in RRC_INACTIVE, it stays in RRC_INACTIVE.

Referring to case ② and ③ of FIG. 8, it may be assumed that the Msg3 delivery fails. If the logical channel or other radio resource is not configured for contention resolution, the UE may not perform further operation. Or, the UE may attempt Msg3 retransmission by restarting from Msg1 Preamble transmission.

Referring to case ④ of FIG. 8, the UE may transmit Msg3 for N times. When the UE completed Msg3 transmission as many times as a preconfigured number, the UE may consider that the procedure is successfully done. The preconfigured number may be configured in UE, or configured from the network as an optimal number. Once the UE attempts its best effort delivery, the UE may consider that the delivery procedure completes successfully.

In this description, several exemplary scenarios may be suggested.

According to an exemplary scenario, for data transmission using semi-persistent scheduling (SPS), the UE may receive SPS configurations from the network. Then, the UE may transmit data, if available, using preconfigured SPS grants. The RRC state of the UE may be one of RRC_CONNECTED, RRC_IDLE, or RRC_INACTIVE when it transmits data. The UE may transmit MAC PDU including data. Upon reception of HARQ ACK for uplink data transmission, the UE may consider the data delivery is successful and completes the procedure.

According to an exemplary scenario, for early data transmission (EDT), the UE may receive UL grant in RA Response. The UE may transmit data in Msg3 if preconditions of EDT are met. The RRC state of the UE may be one of RRC_IDLE or RRC_INACTIVE when it transmits data.

In Control-plane CIoT optimisation, the UE may transmit NAS PDU including data in Msg3 while it transmits MAC PDU including data via separate channel. Upon reception of HARQ ACK for uplink data transmission, the UE may assume that the data delivery is successful unless the UE receives a reject message in Msg4.

According to an exemplary scenario, for early data transmission (EDT), the UE receives UL grant in RA Response. The UE may transmit data in Msg3 if preconditions of EDT are met. The RRC state of the UE may be RRC_IDLE or RRC_INACTIVE when it transmits data. In Control-plane CIoT optimisation, the UE may transmit NAS PDU including data in Msg3 while it transmits MAC PDU including data via separate channel. The UE may transmit Msg3 for N times whose value is preconfigured or received from the network. The UE shall previously receive enough UL grant. After data transmission of N times, the UE may complete the data delivery procedure regardless of Msg4 reception.

According to embodiments of the present disclosure, the UE may perform EDT transmission by skipping contention resolution. With shared resource allocation, it may utilize radio resources efficiently. Further, the UE may determine whether data transmission is successful or not without monitoring feedback on DL reception. Further, reduction of power consumption may be expected by minimize steps of procedure of data transmission.

Specifically, in mMTC where massive IoT devices are deployed in a particular area, the data collector may not need to receive all reports from each device. In other words, it may be considered that it is enough for IoT devices to attempt their best efforts to transmit data, regardless of actual successful data transmission. In this disclosure, the UE may not need to wait for Msg4 to make sure whether or not the data reporting procedure is successful. Once the UE transmits Msg3, the UE may stay or transit to RRC_IDLE or RRC_INACTIVE to save power upon reception of HARQ ACK assuming that the data delivery is successful. In the second method, the UE may transmit data N times without contention resolution (best effort delivery) and stays/transits to RRC_IDLE or RRC_INACTIVE to reduce power consumption.

Figure 9:
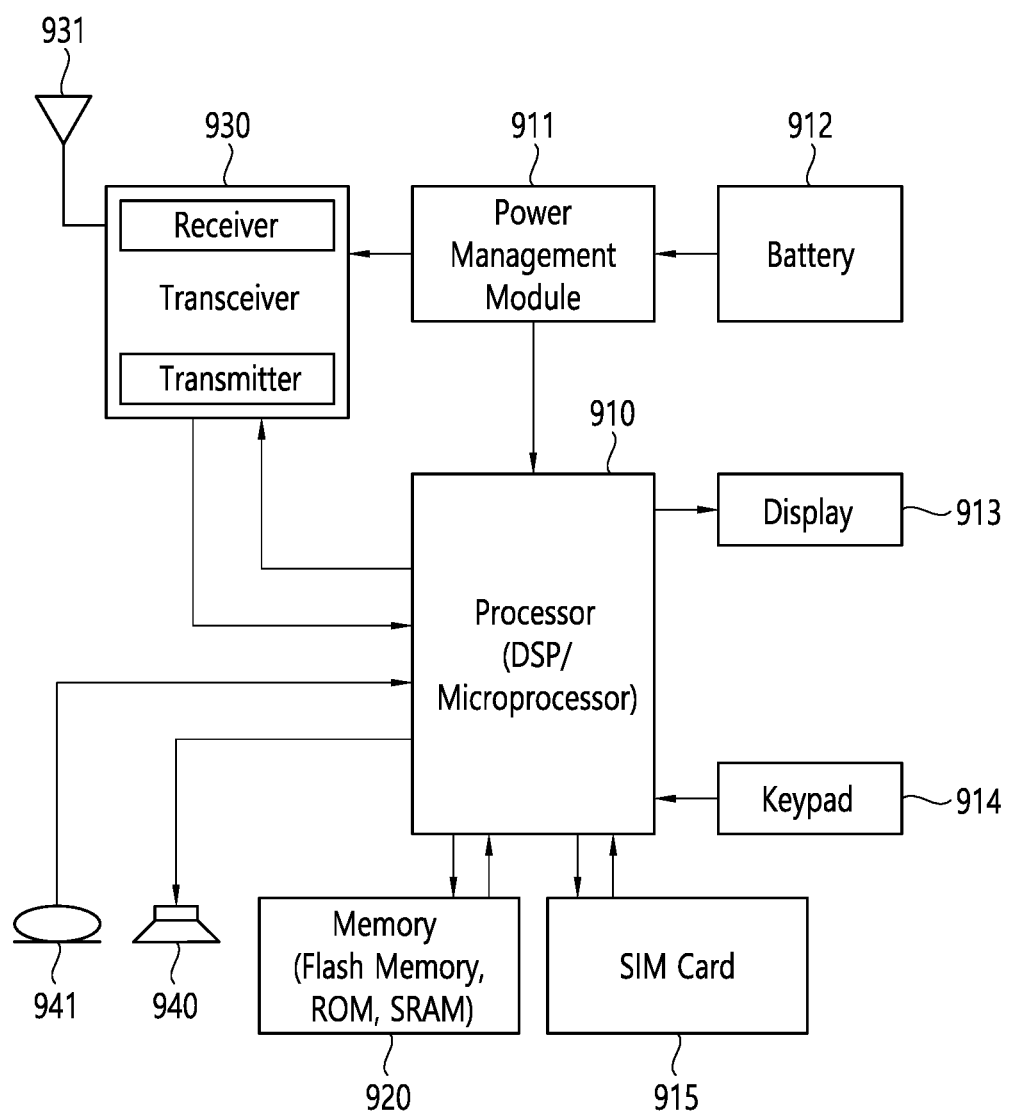
FIG. 9 shows more detailed wireless device to implement an embodiment of the present disclosure.

FIG. 9 shows more detailed wireless device to implement an embodiment of the present disclosure. The present disclosure described above for wireless device side may be applied to this embodiment.

A wireless device includes a processor 910, a power management module 911, a battery 912, a display 913, a keypad 914, a subscriber identification module (SIM) card 915, a memory 920, a transceiver 930, one or more antennas 931, a speaker 940, and a microphone 941.

The processor 910 may be configured to implement proposed functions, procedures and/or methods described in this description. Layers of the radio interface protocol may be implemented in the processor 910. The processor 910 may include ASIC, other chipset, logic circuit and/or data processing device. The processor 910 may be an application processor (AP). The processor 910 may include at least one of a digital signal processor (DSP), a central processing unit (CPU), a graphics processing unit (GPU), a modem (modulator and demodulator). An example of the processor 910 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to an embodiment of the present disclosure, the processor 910 may be configured to detect data to be transmitted.

The processor 910 may be configured to receive information informing that the data does not require a contention resolution. The information may inform that the other logical channel on the specific radio resource requires the contention resolution. The information may be configured per the specific radio resource.

The processor 910 may be configured to transmit the data on a logical channel. The data may be transmitted via a medium access control (MAC) packet data unit (PDU) in a random access procedure. The logical channel may be mapped to a specific radio resource. The specific radio resource may be one of random access channel (RACH) resources, semi-persistent scheduling (SPS) resources, configured grants and dynamic grants. The specific radio resource may be configured to further deliver at least one other logical channel.

The processor 910 may be configured to complete transmission of the data, based on an acknowledgement for the data or a number of transmission of the data. The completing the transmission of the data may include determining whether the number of transmission of the data exceeds a threshold value. The threshold value may be preconfigured in the wireless device or configured by a network.

According to embodiments of the present disclosure, the UE may perform EDT transmission by skipping contention resolution. With shared resource allocation, it may utilize radio resources efficiently. Further, the UE may determine whether data transmission is successful or not without monitoring feedback on DL reception. Further, reduction of power consumption may be expected by minimize steps of procedure of data transmission.

The power management module 911 manages power for the processor 910 and/or the transceiver 930. The battery 912 supplies power to the power management module 911. The display 913 outputs results processed by the processor 910. The keypad 914 receives inputs to be used by the processor 910. The keypad 914 may be shown on the display 913. The SIM card 915 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 920 is operatively coupled with the processor 910 and stores a variety of information to operate the processor 910. The memory 920 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 920 and executed by the processor 910. The memory 920 can be implemented within the processor 910 or external to the processor 910 in which case those can be communicatively coupled to the processor 910 via various means as is known in the art.

The transceiver 930 is operatively coupled with the processor 910, and transmits and/or receives a radio signal. The transceiver 930 includes a transmitter and a receiver. The transceiver 930 may include baseband circuitry to process radio frequency signals. The transceiver 930 controls the one or more antennas 931 to transmit and/or receive a radio signal.

The speaker 940 outputs sound-related results processed by the processor 910. The microphone 941 receives sound-related inputs to be used by the processor 910.

The embodiments of the disclosure may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 10:
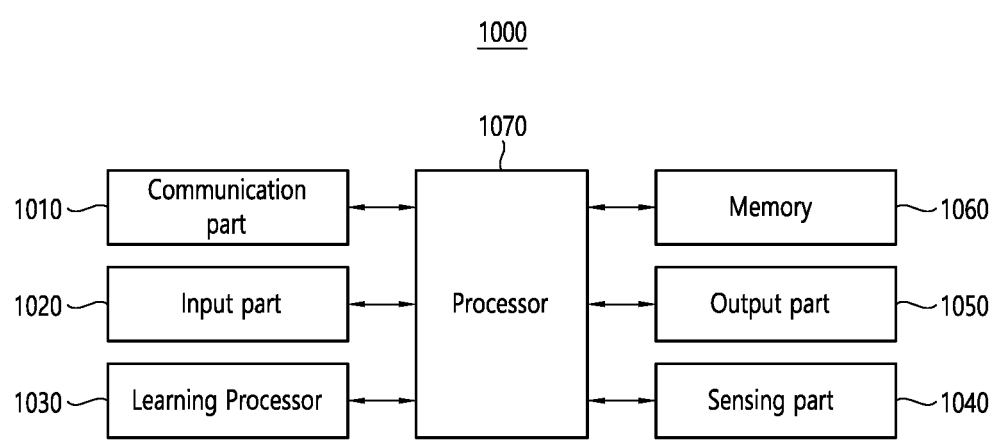
FIG. 10 shows an example of an AI device to which the technical features of the present disclosure can be applied.

FIG. 10 shows an example of an AI device to which the technical features of the disclosure can be applied.

The AI device 1000 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 10, the AI device 1000 may include a communication part 1010, an input part 1020, a learning processor 1030, a sensing part 1040, an output part 1050, a memory 1060, and a processor 1070.

The communication part 1010 can transmit and/or receive data to and/or from external devices such as the AI devices and the AI server using wire and/or wireless communication technology. For example, the communication part 1010 can transmit and/or receive sensor information, a user input, a learning model, and a control signal with external devices. The communication technology used by the communication part 1010 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1020 can acquire various kinds of data. The input part 1020 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1020 can acquire input data to be used when acquiring an output using learning data and a learning model for model learning. The input part 1020 may obtain raw input data, in which case the processor 1070 or the learning processor 1030 may extract input features by preprocessing the input data.

The learning processor 1030 may learn a model composed of an ANN using learning data. The learned ANN can be referred to as a learning model. The learning model can be used to infer result values for new input data rather than learning data, and the inferred values can be used as a basis for determining which actions to perform. The learning processor 1030 may perform AI processing together with the learning processor of the AI server. The learning processor 1030 may include a memory integrated and/or implemented in the AI device 1000. Alternatively, the learning processor 1030 may be implemented using the memory 1060, an external memory directly coupled to the AI device 1000, and/or a memory maintained in an external device.

The sensing part 1040 may acquire at least one of internal information of the AI device 1000, environment information of the AI device 1000, and/or the user information using various sensors. The sensors included in the sensing part 1040 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1050 may generate an output related to visual, auditory, tactile, etc. The output part 1050 may include a display unit for outputting visual information, a speaker for outputting auditory information, and/or a haptic module for outputting tactile information.

The memory 1060 may store data that supports various functions of the AI device 1000. For example, the memory 1060 may store input data acquired by the input part 1020, learning data, a learning model, a learning history, etc.

The processor 1070 may determine at least one executable operation of the AI device 1000 based on information determined and/or generated using a data analysis algorithm and/or a machine learning algorithm. The processor 1070 may then control the components of the AI device 1000 to perform the determined operation. The processor 1070 may request, retrieve, receive, and/or utilize data in the learning processor 1030 and/or the memory 1060, and may control the components of the AI device 1000 to execute the predicted operation and/or the operation determined to be desirable among the at least one executable operation. The processor 1070 may generate a control signal for controlling the external device, and may transmit the generated control signal to the external device, when the external device needs to be linked to perform the determined operation. The processor 1070 may obtain the intention information for the user input and determine the user's requirements based on the obtained intention information. The processor 1070 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1030 and/or learned by the learning processor of the AI server, and/or learned by their distributed processing. The processor 1070 may collect history information including the operation contents of the AI device 1000 and/or the user's feedback on the operation, etc. The processor 1070 may store the collected history information in the memory 1060 and/or the learning processor 1030, and/or transmit to an external device such as the AI server. The collected history information can be used to update the learning model. The processor 1070 may control at least some of the components of AI device 1000 to drive an application program stored in memory 1060. Furthermore, the processor 1070 may operate two or more of the components included in the AI device 1000 in combination with each other for driving the application program.

Figure 11:
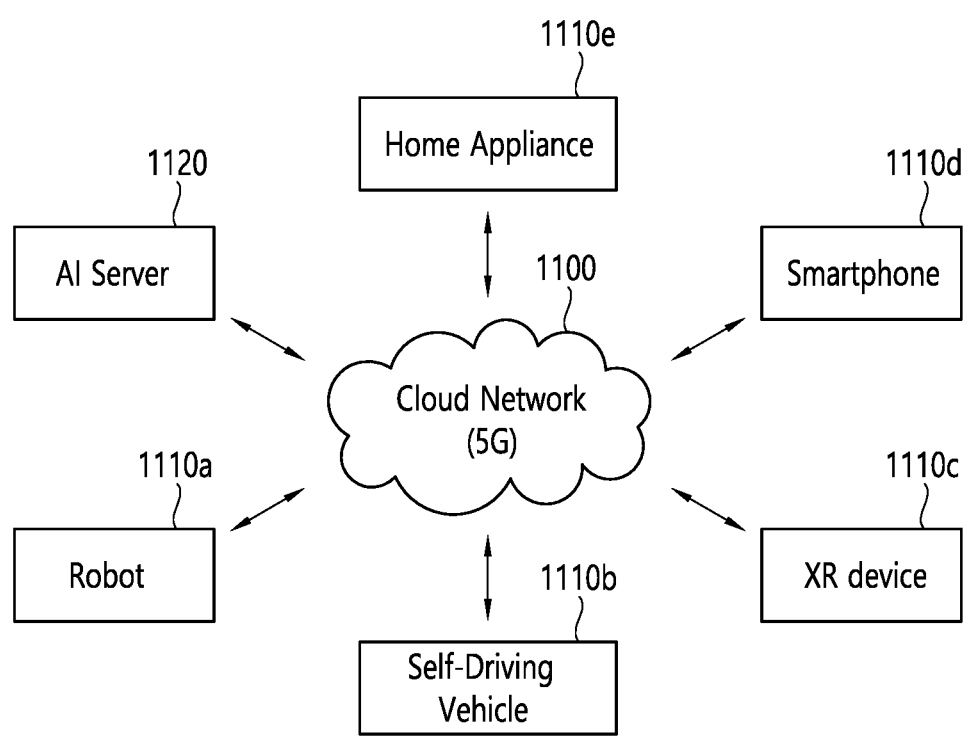
FIG. 11 shows an example of an AI system to which the technical features of the present disclosure can be applied.

FIG. 11 shows an example of an AI system to which the technical features of the present disclosure can be applied.

Referring to FIG. 11, in the AI system, at least one of an AI server 1120, a robot 1110a, an autonomous vehicle 1110b, an XR device 1110c, a smartphone 1110d and/or a home appliance 1110e is connected to a cloud network 1100. The robot 1110a, the autonomous vehicle 1110b, the XR device 1110c, the smartphone 1110d, and/or the home appliance 1110e to which the AI technology is applied may be referred to as AI devices 1110a to 1110e.

The cloud network 1100 may refer to a network that forms part of a cloud computing infrastructure and/or resides in a cloud computing infrastructure. The cloud network 1100 may be configured using a 3G network, a 4G or LTE network, and/or a 5G network. That is, each of the devices 1110a to 1110e and 1120 consisting the AI system may be connected to each other through the cloud network 1100. In particular, each of the devices 1110a to 1110e and 1120 may communicate with each other through a base station, but may directly communicate with each other without using a base station.

The AI server 1120 may include a server for performing AI processing and a server for performing operations on big data. The AI server 1120 is connected to at least one or more of AI devices constituting the AI system, i.e. the robot 1110a, the autonomous vehicle 1110b, the XR device 1110c, the smartphone 1110d and/or the home appliance 1110e through the cloud network 1100, and may assist at least some AI processing of the connected AI devices 1110a to 1110e. The AI server 1120 can learn the ANN according to the machine learning algorithm on behalf of the AI devices 1110a to 1110e, and can directly store the learning models and/or transmit them to the AI devices 1110a to 1110e. The AI server 1120 may receive the input data from the AI devices 1110a to 1110e, infer the result value with respect to the received input data using the learning model, generate a response and/or a control command based on the inferred result value, and transmit the generated data to the AI devices 1110a to 1110e. Alternatively, the AI devices 1110a to 1110e may directly infer a result value for the input data using a learning model, and generate a response and/or a control command based on the inferred result value.

Various embodiments of the AI devices 1110a to 1110e to which the technical features of the present disclosure can be applied will be described. The AI devices 1110a to 1110e shown in FIG. 11 can be seen as specific embodiments of the AI device 1000 shown in FIG. 10.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device operating in a wireless communication system, the method comprising:
    detecting data to be transmitted on a logical channel;
    receiving, from a network, information informing that contention resolution is not configured for the logical channel;
    transmitting, to the network, the data on the logical channel; and
    completing transmission of the data i) upon receiving only an acknowledgement for the data based on the information or ii) after a fixed number of transmissions of the data,
    wherein the logical channel is mapped to a specific radio resource, and
    wherein the specific radio resource is configured to further deliver at least one other logical channel.

2. The method of claim 1, wherein the data is transmitted via a medium access control (MAC) packet data unit (PDU) in a random access procedure.

3. The method of claim 1, wherein the specific radio resource is one of random access channel (RACH) resources, semi-persistent scheduling (SPS) resources, configured grants or dynamic grants.

4. The method of claim 1, wherein the information informs that the contention resolution is configured for the at least one other logical channel.

5. The method of claim 1, wherein the fixed number of transmissions is preconfigured in the wireless device or configured by a network.

6. The method of claim 1, wherein the information is configured per the specific radio resource.

7. The method of claim 1, wherein the wireless device communicates with at least one of a mobile terminal, a network or autonomous vehicles other than the wireless device.

8. A wireless device operating in a wireless communication system, the wireless device comprising:
    a memory;
    a transceiver; and
    a processor, operably coupled to the memory and the transceiver, and configured to:
    detect data to be transmitted on a logical channel;
    control the transceiver to receive, from a network, information informing that a contention resolution is not configured for the logical channel;
    control the transceiver to transmit the data on the logical channel; and
    complete transmission of the data i) upon receiving only an acknowledgement for the data based on the information or ii) after a fixed number of transmissions of the data, wherein the logical channel is mapped to a specific radio resource, and wherein the specific radio resource is configured to further deliver at least one other logical channel.

9. The wireless device of claim 8, wherein the data is transmitted via a medium access control (MAC) packet data unit (PDU) in a random access procedure.

10. The wireless device of claim 1, wherein the specific radio resource is one of random access channel (RACH) resources, semi-persistent scheduling (SPS) resources, configured grants and dynamic grants.

* * * * *